United States Patent [19]
Natoli et al.

[11] Patent Number: 5,171,758
[45] Date of Patent: Dec. 15, 1992

[54] FLAME RETARDANT URETHANE FOAMS MADE USING PROPYLENE OXIDE-BASED POLYOLS

[75] Inventors: Frank S. Natoli, Hamden; John E. Puig, Wallingford, both of Conn.

[73] Assignee: Olin Corporation, Cheshire, Conn.

[21] Appl. No.: 632,720

[22] Filed: Dec. 24, 1990

Related U.S. Application Data

[63] Continuation-in-part of Ser. No. 491,767, Mar. 12, 1990, abandoned.

[51] Int. Cl.$^5$ .......................... C08J 9/08; C08G 18/48
[52] U.S. Cl. .................................... 521/107; 521/128; 521/159; 521/166; 521/170; 521/174; 521/903; 521/906
[58] Field of Search ............... 521/107, 128, 159, 166, 521/170, 174, 903, 906

[56] References Cited

U.S. PATENT DOCUMENTS

| | | | |
|---|---|---|---|
| 4,066,579 | 1/1978 | Yukuta et al. | 521/903 |
| 4,221,875 | 9/1980 | Yukuta et al. | 521/906 |
| 4,251,635 | 2/1981 | Stone | 521/107 |
| 4,258,141 | 3/1981 | Jarre et al. | 521/114 |
| 4,293,657 | 10/1981 | Nissen et al. | 521/121 |
| 4,334,033 | 6/1982 | Metzinger et al. | 521/159 |
| 4,374,207 | 2/1983 | Stone et al. | 521/107 |
| 4,440,705 | 4/1984 | Nissen et al. | 521/174 |
| 4,469,653 | 9/1984 | Nissen et al. | 521/129 |
| 4,485,195 | 11/1984 | Brennan et al. | 521/167 |
| 4,487,852 | 12/1984 | Brennan et al. | 521/167 |
| 4,500,655 | 2/1985 | Brennan | 525/507 |
| 4,590,219 | 5/1986 | Nissen et al. | 521/172 |
| 4,595,705 | 6/1986 | Werner et al. | 521/172 |
| 4,636,531 | 1/1987 | Schmidt et al. | 521/163 |
| 4,644,015 | 2/1987 | Scaccia et al. | 252/182.27 |
| 4,668,708 | 5/1987 | Mueller et al. | 521/159 |
| 4,731,392 | 3/1988 | Streu et al. | 521/172 |
| 4,745,133 | 5/1988 | Grinbergs et al. | 521/128 |
| 4,778,830 | 10/1988 | Streu et al. | 521/172 |
| 4,798,851 | 1/1989 | Werner et al. | 521/137 |
| 4,826,884 | 5/1989 | Grace et al. | 521/906 |
| 4,849,459 | 7/1989 | Grace et al. | 521/110 |
| 4,892,893 | 1/1990 | Grace et al. | 521/129 |
| 5,010,117 | 4/1991 | Herrington et al. | 521/174 |
| 5,057,545 | 10/1991 | Muhl et al. | 521/166 |
| 5,086,082 | 2/1992 | Stone | 521/166 |
| 5,087,384 | 2/1992 | Horacek et al. | 521/170 |

*Primary Examiner*—Morton Foelak
*Assistant Examiner*—Rabon Sergent
*Attorney, Agent, or Firm*—Dale Lynn Carlson

[57] ABSTRACT

The present invention relates to a process for making a flame retardant polyurethane foam which comprises reacting a reaction mixture consisting essentially of a propylene oxide-based polyol that is essentially free of ethylene oxide moieties, a polyisocyanate, melamine in an amount of between about 5 and about 55 parts by weight per hundred parts of the polyol, a halogenated phosphate supplemental flame retardant in an amount of between 8 and about 50 parts by weight per hundred parts of the polyol, and water in an amount of between about 3 and about 6 parts by weight per hundred parts of the polyol, said polyol being further characterized by a molecular weight of between about 2,500 and about 6,000, to provide a polyurethane foam characterized by enhanced flame retardancy.

3 Claims, No Drawings

FLAME RETARDANT URETHANE FOAMS MADE USING PROPYLENE OXIDE-BASED POLYOLS

CROSS-REFERENCE TO RELATED APPLICATIONS

This application is a continuation-in-part of U.S. application Ser. No. 491,767, filed Mar. 12, 1990, now abandoned.

BACKGROUND OF THE INVENTION

In recent years, legislation has been enacted making stringent standards for flame retardancy for certain applications of polyurethane foam. By way of illustration, the so-called "British Standard" (British Standard BS-5852, Part II, Source V, adopted November 1988) sets rigorous standards for furniture foam. In order to pass this flame retardancy test regimen, the urethanes industry has developed combustion-modified foam formulations utilizing specialized polyols, such as so-called high resilient ("HR") polyols, and/or polymer/polyols which are typically utilized in conjunction with melamine as a flame retardant, alone or in conjunction with supplemental flame retardants, in order to provide the required level of flame retardancy to the foam. Unfortunately, these specialized polyols and polymer/polyols are expensive and/or difficult to produce.

New approaches for passing the British Standard test using cheaper, more easily produced polyurethane precursors than those utilized in the past would be highly desired by the polyurethane manufacturing community.

SUMMARY OF THE INVENTION

In one aspect, the present invention relates to a process for making a flame retardant polyurethane foam which comprises reacting a reaction mixture consisting essentially of a PO-based polyol that is essentially free of EO moieties, a polyisocyanate, melamine in an amount of between about 5 and about 55 (preferably between about 10 and about 40) parts by weight per hundred parts of the polyol, a halogenated phosphate supplemental flame retardant in an amount of between 8 and about 50 (preferably between 10 and about 40) parts by weight per hundred parts of the polyol, and water in an amount of between about 3 and about 6 (preferably between about 4 and about 5.5) parts by weight per hundred parts of the polyol, said polyol being further characterized by a molecular weight of between about 2,500 and about 6,000 to provide a polyurethane foam characterized by enhanced flame retardancy, i.e., flame retardancy sufficient to pass the above-mentioned British Standard test or California 117 test.

In another aspect, the present invention relates to the flame retardant polyurethane foam produced by this process. These and other aspects will become apparent from a reading of the following detailed description of the invention.

DETAILED DESCRIPTION OF THE INVENTION

It has now been surprisingly found that flame retardant foams produced using an oxyalkylated polyol containing propylene oxide (PO) moieties and which is essentially free of EO (ethoxy) moieties pass the above-mentioned British Standard test, or other rigorous flame retardancy tests such as the California Technical Bulletin 117 test. This finding is particularly surprising in view of the finding by the present inventors that EO- and mixed EO-/PO-containing polyols do not pass the British Standard test. Such mixed EO-/PO-based polyols have been utilized in the past in producing flame retardant polyurethane foams, as is disclosed, for example, in Example 1 of U.S. Pat. No. 4,258,141; however, the resulting flame retardancy characteristic is less than might be desired.

The principal flame retardant (i.e., the melamine) is employed together with the supplemental flame retardant (i.e., the halogenated phosphate flame retardant) in a flame retardant effective amount. The term "flame retardant effective amount" designates an amount of total flame retardant sufficient to impart flame retardancy to the polyurethane foam sufficient to pass the British Standard Test referred to hereinabove. More particularly, the melamine useful in the present invention is suitably employed in an amount of between about 10 and about 40 parts, preferably between about 15 and about 35 parts by weight per hundred parts of polyol in the urethane-forming reaction mixture. The supplemental halogenated phosphate flame retardant is suitably employed in an amount of between 8 and about 50 parts by weight, preferably between 10 and about 40, more preferably between 12 and about 25, parts by weight per hundred parts of polyol. The total amount of flame retardant is preferably employed in an amount of between about 15 and about 55 (preferably between about 40 and about 50) parts by weight per hundred parts of polyol.

The melamine can be used in any form, as may be desired, including solid or liquid form, ground (e.g., ball-milled) or unground, as may be desired for any particular application. The supplemental halogenated phosphate flame retardant is commercially available, for example, bis(2-chloroethyl)ethylene diphosphate which is commercially available as THERMOLIN 101 ® flame retardant, and bis(2-chloroethyl) monophosphate which is commercially available as FRYOL ® CEF flame retardant.

In accordance with the process of the present invention, water is employed in a minor amount, alone or in combination with supplemental blowing agents. The water reacts with isocyanate in the reaction mixture to form carbon dioxide gas, thus blowing the foam formulation. Instead of water alone, mixtures of water with chemically inert, low boiling, optionally halogenated hydrocarbons can also be used as foaming agents. Suitable optional blowing agents include halogenated hydrocarbons having boiling points below 50° C., preferably, between −50° C. and +30° C., at atmospheric pressure. These include, for example, halogenated hydrocarbons including both chlorofluorocarbons (so-called "CFCs") and hydrochlorofluorocarbons (so-called "HCFCs"), such as monochloro- difluoromethane, dichloromonofluoromethane, dichlorodifluoromethane, trichlorofluoromethane, and their mixtures and hydrocarbons such as propane, n-butane, and isobutane, as well as dimethyl ether and acetone. If used, the supplemental blowing agent is utilized in a "blowing effective amount", i.e., and amount when combined with the primary (carbon dioxide) blowing agent, that is sufficient to provide the desired degree of blowing of the foam formulation. Preferably, the blowing agent employed is CFC-free.

Suitable mixtures of water and optional, supplemental blowing agents generally comprise from about 5 to 70 percent by weight, preferably, 10 to 50 percent by weight, of water and 30 to 95 percent by weight, preferably 50 to 90 percent by weight, of possible halogenated hydrocarbons, with the percentage by weight being based upon the total weight of the blowing-agent mixture.

The required total quantities of blowing agent in the foam formulation can be determined in a simple manner as a function of the mixing ratio of water and optional halogenated blowing agents as well as the desired foam density and are generally employed in an amount of about 2 to 40, preferably, 5 to 25 percent by weight, based on the weight of the polyol.

Catalysts which accelerate the formation of polyurethane and optional additives which are normally used for the manufacture of flexible polyurethane foams can also be added to the foamable reaction mixtures. These include, for instance, surface-active materials, pore regulating agents, antioxidants, hydrolysis-prevention agents, dyes, fillers and other additives.

Suitable catalysts for accelerating the reaction between the polyols, the water, optional chain extenders, and the polyisocyanate mixture according to this invention are, for instance, tertiary amines such as dimethylbenzylamine. N,N,N',N'-tetramethyldiaminodiethyl ether, bis(dimethylaminopropyl) urea, N-methyl- or N-ethylmorpholine, dimethyl piperazine, 1,2-dimethylimidazole, 1-azo-bicyclo-(3,3,0)-octane, and preferably, triethylenediamine; metal salts such as lead octoate, tin di-2-ethylhexoate, and preferably, tin-(II) salts, and dibutyltin dilaurate as well as, in particular, mixtures of tertiary amines and organic tin salts. Preferably used are 0.5 to 5 percent by weight of catalyst based upon tertiary amines and/or 0.01 to 2.5 percent by weight of metal salts, based on the polyol weight.

Organic polyisocyanates useful as reactants in the present invention include any aromatic, cycloaliphatic and aliphatic diisocyanates and higher polyisocyanates. Diisocyanates are the preferred class of polyisocyanates. Suitable aliphatic diisocyanates include hexamethylene diisocyanate, 4,4'-dicyclohexylmethane diisocyanate; isophorone diisocyanate; 1,4-tetramethylene diisocyanate; and 1,10-decamethylene diisocyanate and 1,12-dodecamethylene diisocyanate. Suitable aromatic diisocyanates include toluene-2,4- or 2,6-diisocyanate; 1,5-naphthalene diisocyanate; 4-methoxy-1,3-phenylene diisocyanate; 4-chloro-1,3-phenylene diisocyanate; 2,4'-diisocyanatodiphenyl ether; 5,6-dimethyl-1,3-phenylene diisocyanate; 2,4-dimethyl-1,3-phenylene diisocyanate; 4,4'-diisocyanatodiphenylether; benzidine diisocyanate, 4,4'-diisocyanatodibenzyl; methylene-bis(4-phenyl-isocyanate); and 1,3-phenylene diisocyanate.

Other useful optional additives for possible inclusion in the foam formulation include surface-active substances which serve to support the homogenization of the raw material and which are possibly also suited to regulate the cell structure of the flexible polyurethane foams. These include, for example, siloxane-oxyalkylene mixed polymers and other organic polysiloxanes; oxyethylated alkylphenols, oxyethylated fatty alcohols, paraffin oils, castor oils, castor oil or ricinoleic esters and turkey red oil, which are used in quantities of 0.2 to 6 parts by weight per 100 parts by weight of polyisocyanate employed.

More detailed data on the above-named other commonly used additives is contained in the literature, for instance, in the text by J. H. Saunders and K. C. Frisch, "High Polymers", volume XVI, Polyurethanes, Parts 1 and 2, Interscience Publishers, 1962 and 1964.

The flexible polyurethane foams according to this invention may be manufactured according to the prepolymer process and preferably, according to the one-shot process.

If the flexible polyurethane foams are produced according to the one-shot process, a mixture of po-based polyol, melamine, water, catalyst, and optional chain extenders and/or other optional additives, is suitably reacted with a di- or other isocyanates according to this invention at temperatures of 15° to 60° C., preferably of 25° to 40° C., in such quantities that the ratio of hydroxyl groups of the polyols and optional chain extenders to NCO groups of the polyisocyanate mixture is between about 0.1:1 to 0.4:1, preferably 0.15:1 to 0.3:1, and that the ratio of all Zerewitinoff active-hydrogen atoms, bonded to polyol, optional chain extenders and water, to the NCO group of the polyisocyanate mixture is approximately 0.7:1 to 1.3:1, preferably, 0.9:1 to 1.1:1. If the flame inhibitors have reactive NH groups (such as melamine), they are not taken into consideration in the aforementioned quantity ratios.

Using a mixing chamber with several feed nozzles, the liquid raw materials can be used individually or, if the components are solid, in the form of solutions or suspensions and can be mixed intensively in the mixing chamber. However, an alternate method is to combine the mixture of polyol, melamine, water, catalyst, possibly chain extenders and additives, as component A and to use the isocyanate according to the invention as component B.

In order to manufacture the optionally-employed NCO-group-containing prepolymers, the isocyanate mixture according to this invention is reacted with the above-mentioned polyols and/or chain extenders in such quantities that the ratio of NCO groups to total hydroxyl is 10:1 to 95:1, preferably, 70:1 to 90:1. The obtained prepolymers are subsequently mixed with the melamine, water or mixtures of water and low-boiling, optional halogenated hydrocarbons and, optional, additional polyols and/or chain extenders, catalysts and additives, and the mixture is allowed to foam.

The flexible polyurethane foams manufactured in accordance with this invention are difficult to ignite in accordance with the British Standard BS-5852 and are suited for the known applications for furniture foams and matresses.

The parts referred to in the examples are parts by weight.

The following examples are intended to illustrate, but in no way limit the scope of, the present invention.

EXAMPLE 1

Flexible foams having a density of 2.0 to 2.1 pcf were prepared on a PERIPHLEX ® foam machine using the formulations shown on Table 1. The formulations each contained 30 phr (parts by weight per hundred parts of "resin" which is the polyol) of melamine and the liquid flame retardant (THERMOLIN ® 101) was varied from 10–16 phr. Foams, having the physical properties shown in Table 1, were obtained. Foams were prepared on a periphlex laboratory flexible foam pouring machine at a 75/lb/min. pour rate. Foam blocks measuring approximately 24"×24"×22" were made using the formulations in Table 1 below. The melamine was pre-blended into the polyol using a high shear cowles mixer. It was added in small increments to insure wetting and uniform dispersion. The liquid flame retardant was pumped as a separate stream. Water and amine catalyst were also materbatched with the polyol. Surfactant and tin catalyst were pumped as separate streams.

The resulting foams were placed in a Curing oven maintained at 100° F. overnight and then allowed to cure for 24-48 hours under ambient conditions. The foams were then cut and tested according to British Standard 5852, Part II, Ignition Source V. Briefly, the British Standard test is a mock-up of a chair ignition test employing a 17 gram wooden crib as an ignition source.

The flammability results shown in Table 1 were obtained. The foams prepared with POLY-G(R) 30-56 which is a 3000 molecular weight all-PO polyol passed the British Flammability Standard test. In addition, 50% Compression Set values were on the order of 3-3.5%, much lower than the approximately 30% value typically obtained for conventional foams made using, for example, an HR polymer/polyol, at a level of 30 phr of melamine.

The foams prepared with POLY-G 32-52 which is a 3250 molecular weight hetero polyol containing approximately 10 percent randomly mixed ethylene oxide and no primary hydroxyl groups, all failed the British Standard Test. The results obtained with the all-PO polyol (POLY-G 30-56) were surprising and completely unexpected since the structural differences in the polyol would not suggest the significant difference in flammability performance of the resulting foams.

Additional tests were performed using formulations identical to Formulations 2-4 of Table 1 except that the amount of water was increased from 4.0 up to 5.2 phr. These additional formulations provided lower density foams having densities of 1.42-1.43 pcf, and all passed the British Standard 5852, Part II, Ignition Source V flammability test.

Additional tests were also performed using formulations identical to Formulations 2-4 of Table 1 except that the amount of melamine was decreased from 30 phr down to 10 phr, and all passed the British Standard flammability test. In contrast, a formulation identical to Formulation 1 of Table 1, except having 10 phr of melamine, failed the British Standard flammability test.

Additional tests were run using formulations identical to Formulations 1-4 of Table 1, except that the THERMOLIN® 101 was replaced with FRYOL® CEF which is bis(2-chloroethyl) monophosphate. All of these foams passed the British Standard flammability test, even the foam containing only 10 phr of the FRYOL® CEF flame retardant.

TABLE 1

EFFECT OF POLYOL STRUCTURE ON BS-5852 FLAMMABILITY RESULTS

| FORMULATION | 1 | 2 | 3 | 4 | COMP. FORM. A | COMP. FORM. B |
|---|---|---|---|---|---|---|
| POLY-G ® 32-52 | — | — | — | — | 100 | 100 |
| POLY-G ® 30-56 | 100 | 100 | 100 | 100 | — | — |
| Melamine (Unground) | 30 | → | → | → | → | → |
| THERMOLIN ® 101 | 10 | 12 | 14 | 16 | 14 | 16 |
| Water | 4.0 | → | → | → | → | → |
| DMEA | .22 | → | → | → | → | → |
| Dabco 33LV | .15 | → | → | → | → | → |
| L-5740 | 1.0 | 1.0 | 1.0 | 1.0 | 1.0 | 1.0 |
| T-10 | .5 | .55 | .60 | .66 | 0.54 | .59 |
| TDI-80 (106I) | 50.2 | → | → | → | → | → |
| PHYSICAL PROPERTIES | | | | | | |
| Density, pcf | 1.98 | 2.04 | 2.07 | 2.08 | 2.10 | 2.09 |
| IFD, lb/50 in$^2$ | | | | | | |
| 25% | 43 | 40.5 | 46 | 49.2 | 52.0 | 50 |
| 65% | 90 | 100 | 103.5 | 105 | 106.5 | 105.0 |
| Support Factor | 2.09 | 2.47 | 2.25 | 2.13 | 2.05 | 2.10 |
| Air Flow, cfm | 2.3 | 1.9 | 1.5 | 1.0 | .6 | .3 |
| Resilience | 31 | 31 | 29 | 29 | 27 | 19 |
| Tensile Strength | 11.8 | 12.2 | 12.1 | 12.0 | 13.6 | 13.2 |
| Elongation, % | 173 | 173 | 163 | 170 | 173 | 173 |
| Tear Strength, pli | 1.8 | 1.6 | 1.6 | 1.5 | 2.0 | 1.8 |
| Compression Set, Ct | | | | | | |
| 50% | 3.2 | 3.0 | 2.6 | 3.5 | 3.6 | 3.9 |
| 90% | 6.8 | 5.8 | 5.9 | 6.7 | 8.0 | 8.4 |
| BS-5852 RESULTS | | | | | | |
| Weight Loss, Gms. | 65.9 | 47.2 | 36.2 | 38.1 | 217.1 | 246.7 |
| Time to Flame Extinction, Minutes | 3:26 | 4:12 | 3:14 | 3:04 | 4:42 | 8:43 |
| Burn Through, Base | No | No | No | No | No | No |
| Burn Through, Back | Yes | No | No | No | Yes | Yes |
| Rating | Fail | Pass | Pass | Pass | Fail | Fail |

What is claimed is:

1. A process for making a flame retardant polyurethane foam which comprises reacting a reaction mixture consisting essentially of a propylene oxide-bases polyol that is essentially free of ethylene oxide moieties, a polyisocyanate, melamine in an amount of between 10 and 30 parts by weight per hundred parts of the polyol, a halogenated phosphate supplemental flame retardant in an amount of between 12 and 16 parts by weight per hundred parts of the polyol, and water in an amount of between about 3 and about 6 parts by weight per hundred parts of the polyol, said polyol being further characterized by a molecular weight of between about 2,500 and about 6,000, to provide said polyurethane foam.

2. The process of claim 1 wherein said mixture additionally contains a supplemental blowing agent in an amount sufficient to provide supplemental blowing in producing said polyurethane foam.

3. The flame retardant polyurethane foam produced by the process of claim 1.

* * * * *

UNITED STATES PATENT AND TRADEMARK OFFICE
CERTIFICATE OF CORRECTION

PATENT NO. : 5,171,758

DATED : December 15, 1992

INVENTOR(S) : Natoli et al.

It is certified that error appears in the above-identified patent and that said Letters Patent is hereby corrected as shown below:

At column 6, at line 51 please delete "oxide-bases" and insert ---oxide-based--- in its place.

Signed and Sealed this

Thirtieth Day of November, 1993

*Attest:*

BRUCE LEHMAN

*Attesting Officer*  *Commissioner of Patents and Trademarks*